United States Patent
Lai et al.

(10) Patent No.: US 7,486,866 B2
(45) Date of Patent: Feb. 3, 2009

(54) STRUCTURE AND FABRICATION METHOD FOR HIGH TEMPERATURE INTEGRATION ROD

(75) Inventors: Chien-Chih Lai, Hsinchu (TW); Chin-Ming Chung, Hsinchu (TW); Juin-Hong Lin, Hsinchu (TW); Pi-Tsung Hsu, Hsinchu (TW); Chiih-Wei Tso, Hsinchu (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 430 days.

(21) Appl. No.: 11/292,091

(22) Filed: Dec. 2, 2005

(65) Prior Publication Data

US 2006/0119946 A1    Jun. 8, 2006

(30) Foreign Application Priority Data

Dec. 3, 2004    (TW) .............................. 93137448 A

(51) Int. Cl.
*G02B 6/00* (2006.01)
(52) U.S. Cl. ..................................................... 385/133
(58) Field of Classification Search ................ 385/133; 359/274, 368, 588, 600, 726, 885, 883; 362/297
See application file for complete search history.

(56) References Cited

U.S. PATENT DOCUMENTS

| | | | | |
|---|---|---|---|---|
| 4,498,067 A | * | 2/1985 | Kumokawa et al. | ........... 336/65 |
| 4,544,828 A | * | 10/1985 | Shigenobu et al. | .......... 219/216 |
| 7,169,252 B2 | * | 1/2007 | Frei et al. | ................... 156/314 |
| 2004/0126077 A1 | * | 7/2004 | Strobl et al. | ................. 385/133 |
| 2005/0018302 A1 | * | 1/2005 | Yano et al. | ................... 359/588 |

* cited by examiner

*Primary Examiner*—Quyen P Leung

(57) ABSTRACT

A fabrication method for hollow integration rod suitable for high temperature operation, comprising the steps: (a) prefixing a set of mirrors to be a hollow integration rod by a light curable adhesive (such as UV curable adhesive); and (b) fixing those mirrors permanently by an inorganic adhesive. Wherein the mirrors can be a High Reflective Mirror with dielectric thin films, or it could be a High Reflective Mirror made of metallic thin film and coating a dielectric thin films by deposition for enhancing the reflection and protection purpose; for a all dielectric film, since there are multi-layer of thin dielectric films been deposited thereon, to prevent the warpage or distortion due to film stress in deposition process, several layers of thin film of silicon oxide SiOx can be predeposited on the backside of the mirror to balance.

12 Claims, 3 Drawing Sheets

STRUCTURE AND FABRICATION METHOD FOR HIGH TEMPERATURE INTEGRATION ROD

DESCRIPTION OF THE INVENTION

1. Field of the Invention

This invention relates to a structure and fabrication method for hollow integration rod of a digital projector, in particular, to use different adhesives on the mirrors in two steps. Also means the mirrors of the hollow integration rod containing dielectric thin films which deposited additionally on backside of the mirrors.

2. Background of the Invention

Digital projector utilizes high power light bulb as its source light, yielding a high temperature light beam to pass through a lens and focus on the entrance end of a integration rod, to form a light beam which is substantially uniform in power distribution over the surface area of the exit end, and to project picture on screen more clear and bright through the color wheel and Digital Micro-mirror Device.

Integration device could be sort into hollow integration rod and solid integration rod, wherein the hollow integration rod is with fewer problems of heat-collective than the solid integration rod, nevertheless, the mirrors of the hollow integration device produced the stress of distortion. High illumination projector uses high watt light bulb that about 250 watt which would yielding an extremely high temperature.

In the present day, the hollow integration rod is mainly using the adhesive of Epoxy series adhesive to bond the mirrors, but the series of Epoxy has a heat-resistant only 100 degree to 150 degree centigrade, and is easily to be deteriorated when exposed to UV radiation inside the projector, hence the life of its usage is limited.

When the heat accumulated more and more, causing high operation temperature inside the digital projector, would significantly deteriorate the adhesive on the hollow integration rod. Once the strength is weaken and be unable to keep the structure of the hollow integration rod, the hollow integration rod must collapse and out of shape.

Moreover, the commercial available hollow integration rod, normally, has an internal surface coated with a layer of metal film to reflect light beam multiple times inside while a light passing through. But since the long time exposure to contact the sulfide in air would causing sulfuration on the metallic film and would deteriorating the performance of the metallic film, especially under a high temperature. Therefore, the performance would diverge from the original design specification.

SUMMARY OF THE INVENTION

In order to overcome the problems mentioned above about the hollow integration rod, there is an object of the present invention to provided a modified fabrication method, to avoid the drawbacks which may caused by adhesive deteriorated and the distortion stress which may yielded from high operation temperature, and to enhance the structure reliability and performance to the hollow integration rod in high operation temperature.

In accordance with present invention, to assembly the mirrors of the hollow integration rod comprising: (a) pre-fixing a set of mirrors to be a hollow integration rod by a light curable adhesive (such as UV curable adhesive); and (b) fixing those mirrors permanently by an inorganic adhesive.

In accordance with the present invention, the mirrors of the hollow integration rod can be either made from a plurality of high reflective mirrors with dielectric thin films, or a reflective mirror containing a layer of metallic film, and deposited a layer of dielectric thin films to act as a protecting film of the metallic film. The mirrors, preferably, being deposited with a multi-layer of $SiO_x$ thin film on the backside, to balance the distortion stress which may be caused by the deposition process of dielectric thin films on another side.

Since high reflective mirror of dielectric thin films, the dielectric thin films (dielectric Film) with a reflection rate higher than the metallic film in general; furthermore, the distortion of the mirrors can be control since the thickness of the film is adjustable.

The advantages and the spirit of the present invention are further understood by the following description and drawings.

DESCRIPTION OF THE EMBODIMENTS

Figure 1:
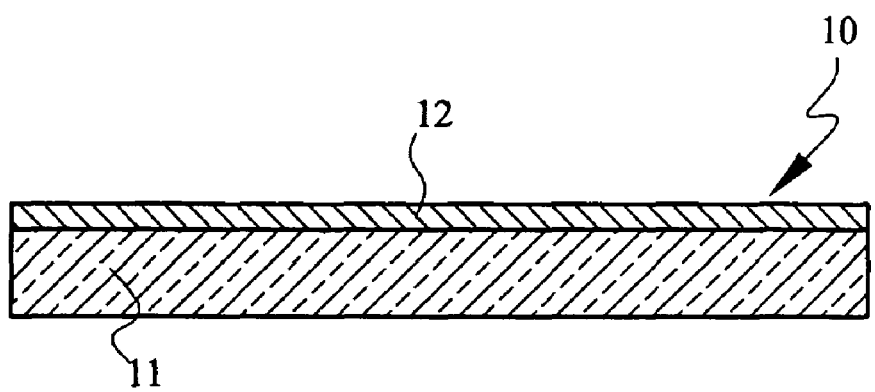
FIG. 1 is a cross-sectional view showing a mirror structure of the prior art.

Referring to FIG. 1, the ordinary mirrors (10) of hollow integration rod are the reflected mirrors which coated with a metallic film (12) on glass substrate (1). There is no coating on backside for balancing distortion of the mirrors.

Figure 2:
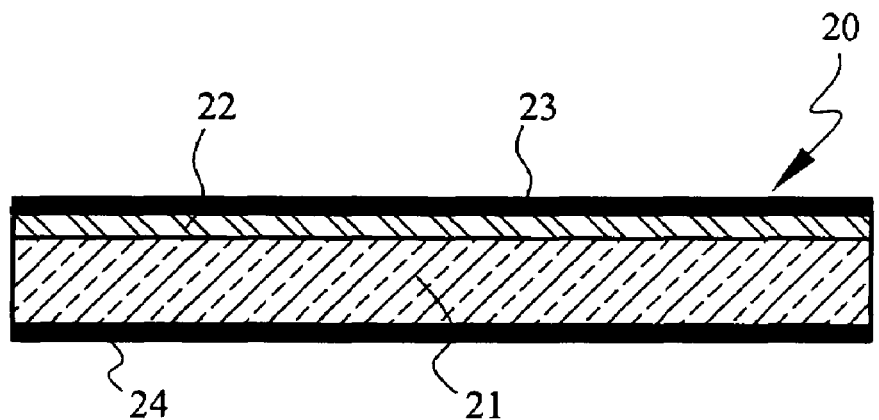
FIG. 2 is a cross-sectional view showing a mirror structure in accordance with the present invention.

Referring to FIG. 2 shown an embodiment to assemble the mirrors (20) of a hollow integration rod in accordance with the present invention, the surface of metallic film (12) on the glass substrate (21) can either be disposing dielectric thin films of $SiO_2$—$TiO_2$, or the film of $SiO_2$—$TiO_2$—$SiO_2$—$TiO_2$, which is formed a protection film (23) and enhancing the rate of reflection. The preferred embodiment of present invention further disposing one or several layers of $SiO_2$ thin film (24) on backside of the glass substrate (21), in order to balance the stress of dielectric thin films which may cause the distortion.

Figure 3:
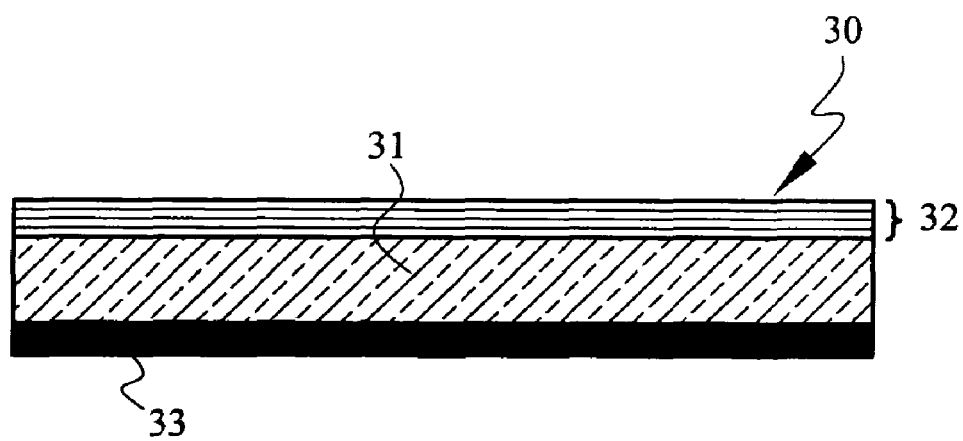
FIG. 3 is a cross-sectional view a mirror structure in accordance with the present invention.

Referring to FIG. 3, an embodiment for assemble the mirrors (30) of a hollow integration rod in accordance with the present invention, a high reflective mirror is made of a glass substrate (31) with a dielectric film (32), wherein the dielectric film (32) can be initially designed with a system of $[HL]^8[1.2H\ 1.2L]^8[1.4H\ 1.4L]^8[1.6H\ 1.6L]^8$ (same as the indication of ¼ wavelength of film thickness as an expression of optic film, wherein "H" means the material with a greater refractive index than substrate, "L" means the material with a smaller refractive index than substrate). The number of the layers which is reduced by using refined method, in order to have a high reflection rate to great angle of incidence of 500 to 800 as well as wide wave range from 400 nm to 700 nm. For achieving the goal of high heat resistance of the dielectric film (32), the known process of Ion Assisted Deposition (IAD) can be made to use for enhancing the dense of the structure, and strengthened the film to bear more high temperature and unfavorable conditions. Meanwhile, in order to balance distortion of the mirror, the backside of the glass substrate can be disposed one or several layers of $SiO_2$ film (33).

Since commercial available Epoxy adhesive in prior art for fabrication of hollow integration rod, has heat resistance only about 100 to 150 degree centigrade, and the life is short for deteriorated under exposure to UV radiation inside the projector. In the preferred embodiment of present invention, we have overcome this problem by adopting inorganic adhesive. Such adhesive has a long life with high heat resistant ranged from 100 to 350 degree centigrade, and has good quality for not be deteriorated under UV radiation.

Figure 4:
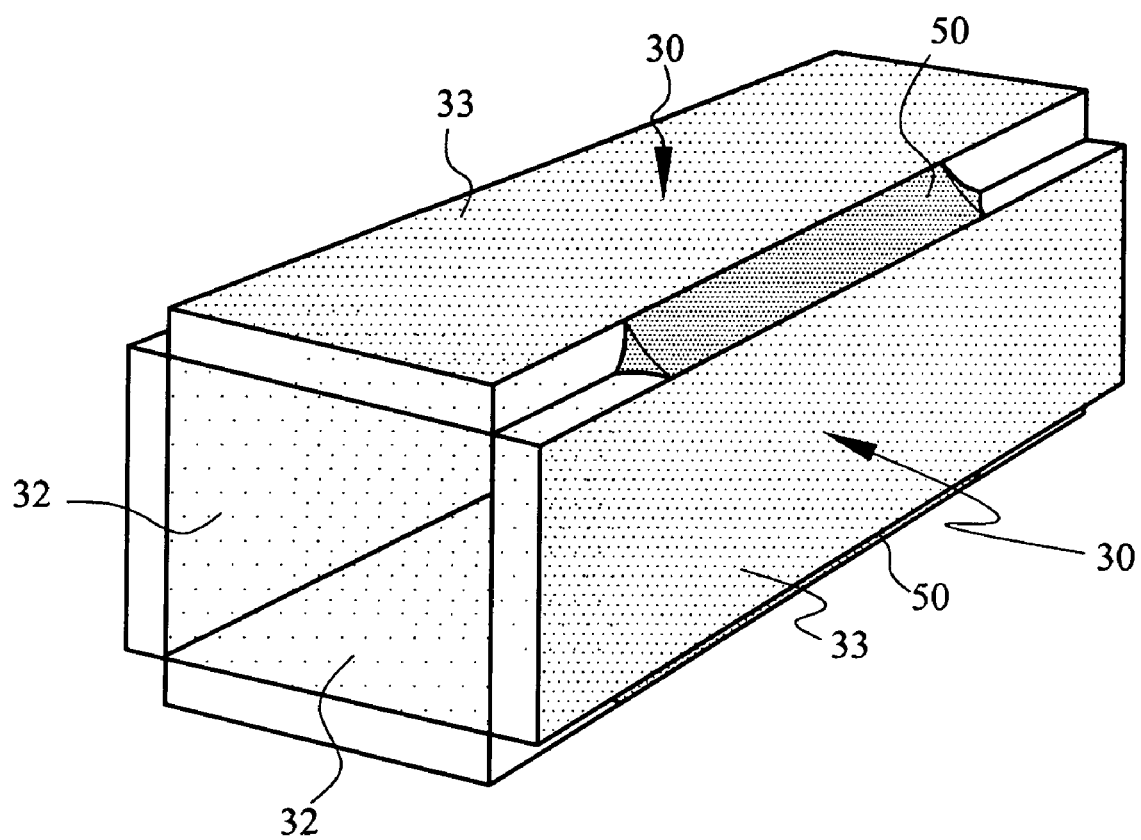
FIG. 4 is a perspective view of a hollow integration rod according to the present invention.
Figure 5:
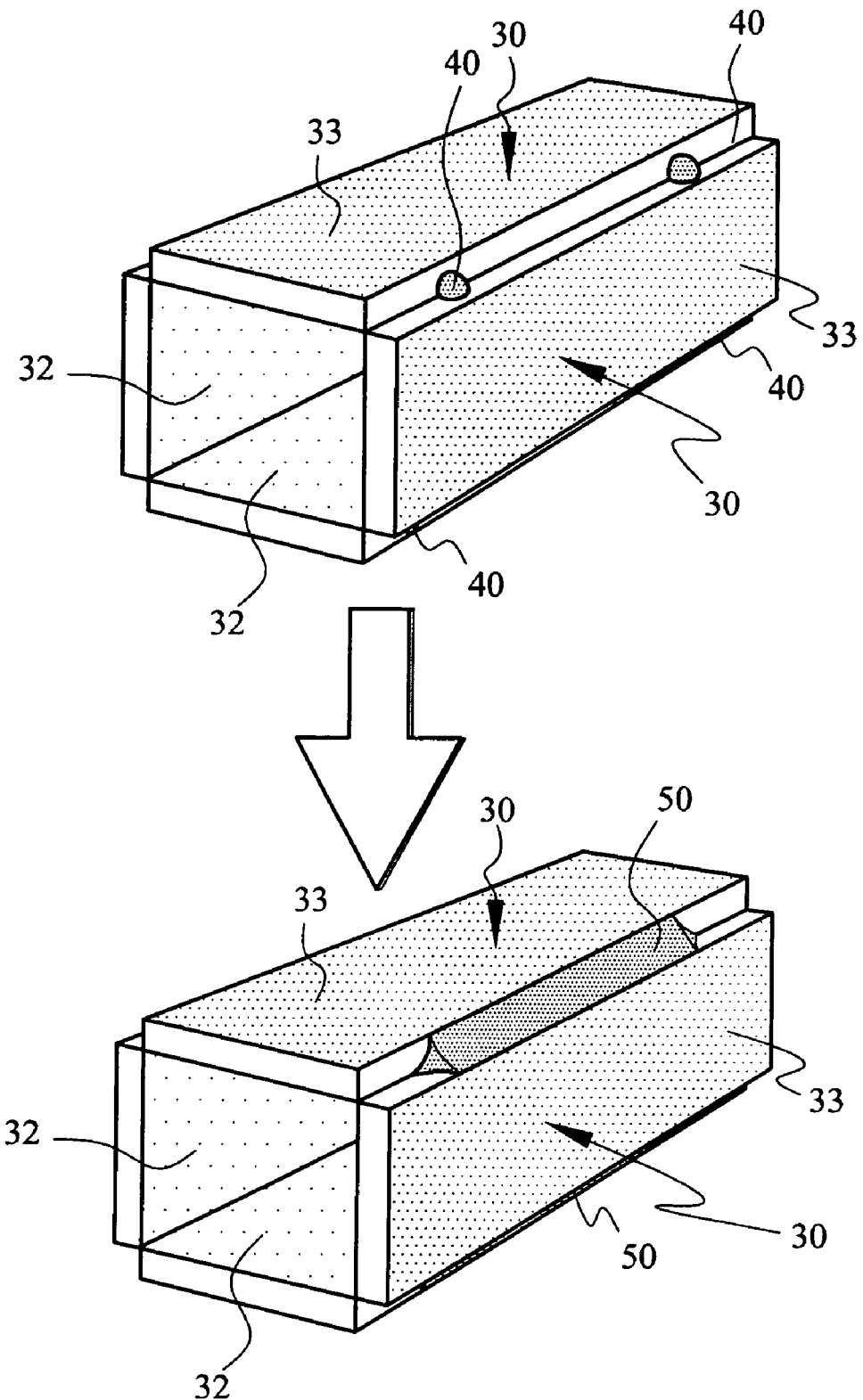
FIG. 5 is a schematic view showing the steps in accordance with the present invention.

Referring to FIGS. 4 and 5, shown an embodiment of hollow integration rod in accordance with the present invention. The steps for assembly of the mirrors into a hollow integration rod, may comprising (a) to utilize a light curable adhesive (40, such as UV-curable adhesive) for fixing the mirrors (30) to be a hollow integration rod in temporary; and than (b) to apply an inorganic adhesive (50) to fix said mirrors for permanently.

This is the first time and never heard it before, selecting to utilize an inorganic adhesive in fabrication of a hollow integration rod, the adhesive shall be kept steady under the temperature ranged from 100 to 350 degree centigrade, and shall not be deteriorated by UV radiation, thus could make the product life more longer. Said inorganic adhesive could be a commercial available ceramic adhesive (such as Aron Ceramic Type C, D, E or F provided by Tex Year Industries Inc). The material of said adhesive can bear a high temperature more than 1000 degree centigrade and unaffected quality under UV radiation, which is perfectly for working environment inside the projector. Said adhesive can be added water to reduce its viscosity and enabling to apply the adhesive smoothly (the rate of adding water can be ranged from 5% to 50%). Preferably, adding water from 10% to 30%, to Aron Ceramic Type D thus can reach a good quality of fabrication of a hollow integration rod. More preferably, it is suggested to add water ranged from 15% to 20% to Aron Ceramic Type D, that may reach a best result from ever been found by the inventors.

Referring to FIG. 5, the method according to the present invention comprising the steps of (a) to pre-fix the mirrors 30 temporary to form as a hollow integration rod with a UV curable adhesive; and then (b) to apply a ceramic adhesive (Aron Ceramic Type D, contained 20% to 30% water) to the joint edges of the mirrors (in according to the present invention, the joint edges is not fully applied with the ceramic adhesive; and preferably, to leave a gap without the adhesive); then to keep it at room temperature for no less than 12 hours, to heat for dehydration at 90° for two hours and heating again to hardening by fully dehydrating at a 150 degree centigrade for another two hours, then let it cool down.

The preferred embodiments have been set forth herein for the purpose of illustration. As aforementioned statement, any minor improvements of technique are crucial to competition and reputation of the manufacturer of projector industry. The fabrication method as indicated in this present invention is unique and a magnificent progress to the industry. Any fabricated application of said method shall be covered by the claims indicated in the present invention.

What is claimed is:

1. A fabrication method for high temperature integration rod, suitable to form a hollow integration rod by using a plurality of mirrors, comprising the steps of:
    (a) pre-fixing a set of mirrors to be a hollow integration rod by a light curable adhesive; and
    (b) fixing those mirrors permanently by an inorganic adhesive, including
        (b1) dispensing a ceramic adhesive onto the joint edges, and
        (b2) keeping the ceramic adhesive and the mirrors at room temperature for 24 hours, and
        (b3) hardening the ceramic adhesive by heating at 90° for one hour to dehydrate, heating at 150° for one hour for complete dehydration and hardening the ceramic adhesive and cooling at room temperature.

2. A fabrication method according to claim 1, wherein the light curable adhesive is UV curable adhesive.

3. A fabrication method according to claim 1, wherein the inorganic adhesive is ceramic adhesive.

4. A fabrication method according to claim 1, wherein ceramic adhesive is "Aron Ceramic Type D" with water containing 10%-30%.

5. A structure for high temperature integration rod, using a plurality of mirrors to form as a length of hollow tube, each mirror comprising:
    a glass substrate;
    a plurality of dielectric thin films formed as a structure of: $[HL]^8[1.2H\ 1.2L]^8[1.4H\ 1.4L]^8[1.6H\ 1.6L]^8$, coated by deposition on a first side of said glass substrate;
    a $SiO_2$ thin deposition layer, coated by a deposition process on a second side of said glass substrate for preventing warpage or distortion due to film stress in said deposition process; and
    an inorganic adhesive bonded on the joint edges between said mirrors.

6. A structure according to claim 5, wherein said dielectric thin films are formed by Ion Assisted Deposition.

7. A structure according to claim 5, wherein said inorganic adhesive is a ceramic adhesive.

8. A structure according to claim 5, wherein said inorganic adhesive is "Aron Ceramic Type D."

9. A structure for high temperature integration rod, using a plurality of mirrors to form as a length of hollow tube, wherein the mirror is made of high reflective dielectric mirror, comprising:
    a glass substrate;
    a metal film plated on one side of said substrate;
    a protective film coated on the metal film and being a dielectric thin film of at least $SiO_2$—$TiO_2$;
    a SiOx film; and
    an inorganic adhesive bonded on the joint edges between said mirrors wherein said glass substrate has a $SiO_2$ thin film pre-deposited on the opposite side for preventing the warpage or distortion from deposition process on said glass substrate.

10. A structure according to claim 9, wherein said dielectric thin film is $SiO_2$—$TiO_2$—$SiO_2$—$TiO_2$.

11. A structure according to claim 9, wherein said inorganic adhesive is a ceramic adhesive.

12. A structure according to claim 9, wherein said inorganic adhesive is "Aron Ceramic Type D."

* * * * *